United States Patent [19]

Gryp et al.

[11] Patent Number: 5,735,509
[45] Date of Patent: Apr. 7, 1998

[54] SEAT SUSPENSION ASSEMBLY

[75] Inventors: Dennis J. Gryp, East Moline; Mark H. Toomey, Moline, both of Ill.

[73] Assignee: Sears Manufacturing Company, Davenport, Iowa

[21] Appl. No.: 597,435

[22] Filed: Feb. 8, 1996

[51] Int. Cl.$^6$ ............... F16F 5/00; F16M 13/00
[52] U.S. Cl. ............ 267/131; 248/550; 248/631; 267/113
[58] Field of Search .................... 267/131, 117, 267/113; 297/344.16; 248/550, 631, 421, 575, 592, 598, 425; 296/65.1

[56] References Cited

U.S. PATENT DOCUMENTS

| | | |
|---|---|---|
| 4,397,440 | 8/1983 | Hall et al. |
| 4,856,763 | 8/1989 | Brodersen et al. ............ 267/131 |
| 4,946,145 | 8/1990 | Kurabe. |
| 5,125,631 | 6/1992 | Brodersen et al. ............ 267/131 |
| 5,234,203 | 8/1993 | Smith ........................ 267/131 |
| 5,564,520 | 10/1996 | Forsythe. |
| 5,618,021 | 4/1997 | Brodersen ................... 267/131 |

OTHER PUBLICATIONS

Schematic Drawing of Levelling valve of WABCO Dated Aug. 6, 1993.
Schematic Drawing of Height Adjust FleetCruiser of Sears Dated Nov. 11, 1992.
Schematic Drawing of Sears Dated May 11, 1994.

Primary Examiner—Douglas C. Butler
Attorney, Agent, or Firm—Niro, Scavone, Haller & Niro

[57] ABSTRACT

A pneumatic seat suspension assembly including upper and lower support members with scissors linkages extending therebetween, a pneumatic spring operatively attached between one set of opposing parallel scissors arms, a height adjuster in communication with the pneumatic spring, a dump valve in communication with the pneumatic spring and a safety rollover valve in communication with the pneumatic spring. The scissors linkage provides the mechanical connection between the seat bottom and the seat support while the pneumatic spring provides the structure to raise and lower the seat bottom by use of compressed air which causes the parallel scissors linkages to be pushed upward causing the seat to rise. The height adjuster consists of an air valve connected via air lines to the pneumatic spring and to a valve to transmit or vent pressurized air to or from the spring to allow the seat to be biased vertically within a range while the pressurized air within the air spring compensates for the weight of the seat occupant. The dump valve provides a trigger which, when actuated, releases the air from the pneumatic suspension assembly to lower the seat to its lowest point to allow easy access to the seat such that when re-activated allows for the seat to regain its pre-dump position. The rollover valve is connected along the main air line to the pneumatic spring such that, when the plane of the seat bottom reaches approximately 80° from the horizontal, the air in the pneumatic spring is released allowing for the seat bottom to descend to its lowest position.

8 Claims, 3 Drawing Sheets

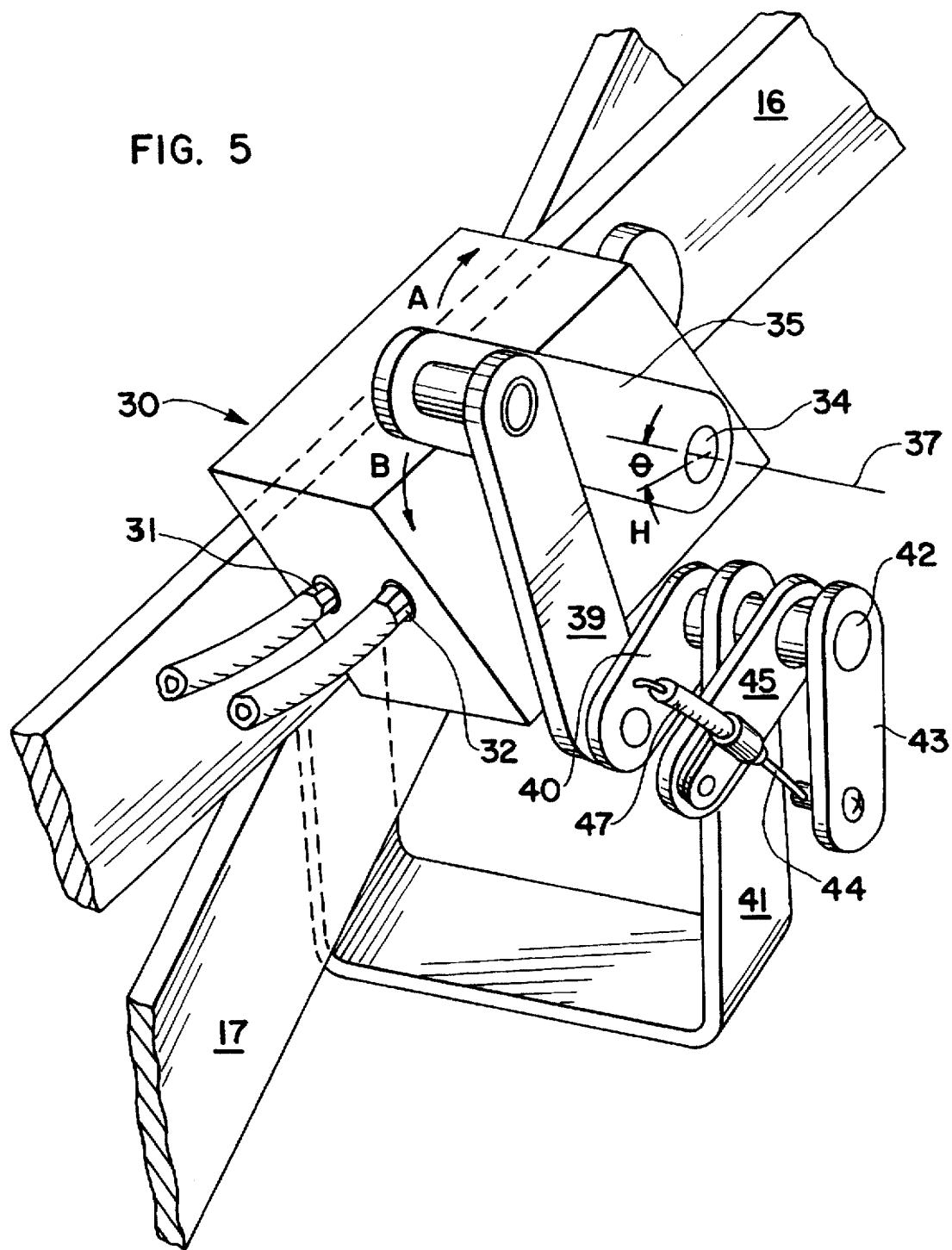

SEAT SUSPENSION ASSEMBLY

BACKGROUND OF THE INVENTION

This invention relates to a vehicle seat suspension assembly and, more particularly, to the suspension and weight adjustment mechanisms employed in such assemblies. The present invention relates to suspension assemblies including seat suspensions in which height and weight adjustment capabilities are desirable, such as those typically used in trucks and construction and farming equipment.

Such vehicle seat suspensions commonly employ scissors linkage type seat suspensions, as shown and described in U.S. Pat. No. 5,125,631, incorporated herein by reference. In many such systems, a pneumatic spring operatively joins a lower support member and parallel, opposing scissors linkages for height adjustment and seat suspension. Additionally, very often a shock absorber may allow for damping the play between the maximum and minimum vertical travel of the seat.

These systems provide convenient vertical adjustability in seats. Room for improvement exists with such systems, however. Such systems generally provide means to allow manual adjustment of a seat for the weight of a seat occupant but do not automatically regulate the height adjustment to prevent the seat from traveling to, or above, its maximum intended height or below its minimum intended height.

Other difficulties have been encountered in the height and weight adjustment mechanisms of seat suspensions. Frequently the controls for such mechanisms are difficult to reach, require levers or triggers that can pinch an operator, and generally are complicated and expensive. Furthermore, such mechanisms can be cumbersome to operate when a vehicle is moving and the operator must grope or search for the adjustment mechanism.

Furthermore, many manual, mechanical seat adjustment mechanisms are limited to a maximum of three height adjustment positions, which limits the degree of comfort that can be obtained by a driver. Some of these seats are difficult to adjust vertically because of the inability to elevate the seat upward. At the same time, in providing a means with mechanical power to raise the seat, it is desirable to continue to avoid having difficult to reach and difficult to operate levers to actuate the power height adjustment.

Furthermore, current pneumatic seat suspension systems do not provide for emergency egress in dangerous situations. Occasionally, heavy vehicles employing such suspensions will tip or roll over. When this happens, the operator may be trapped and pinned against the vehicle roof or operating panel. It would be beneficial if a vehicle seat suspension alleviated this situation. Additionally, the currently known suspension systems can be inconvenient because they do not allow for easy lowering when exiting or entering the vehicle in everyday situations.

The present invention provides a pneumatic seat suspension assembly which solves the problems with currently available pneumatic seat suspensions.

SUMMARY OF THE INVENTION

The present invention improves upon current seat suspensions and adjustment assemblies by providing a height and weight adjustment assembly in fluid communication with the pneumatic seat suspension. The height and weight adjustment assembly of the present invention is in fluid communication with the pneumatic spring weight adjuster such that the seat occupant can manually adjust the vertical stroke of the seat suspension once the pneumatic suspension is adjusted for the weight of the seat occupant. The suspension assembly of the present invention also provides a dump valve in communication with the pneumatic spring to manually disconnect the air supply to the pneumatic spring and allow the seat to travel to its lowest position for easy access to the seat. The suspension assembly of the present invention also provides a rollover dump valve which automatically disconnects the pressurized air supply from the air spring if the plane of the seat becomes rotated to a predetermined angle from horizontal to allow the seat to travel to its lowest position relative to the seat support for safety reasons when the vehicle in which the seat resides tips or rolls over.

Use of the present invention thus allows for one convenient pneumatic system to automatically, simultaneously regulate both the height and weight adjustment for a seat. The present invention also provides a convenient dump valve associated with the suspension system for convenient entry and exit from the seat. The present invention also provides for a safety rollover release valve which automatically disconnects the pressurized air supply to the air spring suspension system in case of a vehicle rollover situation.

One of the primary objects of the present invention, therefore, is to provide a convenient, vertically adjustable seat suspension assembly which allows for one pneumatic system to control both the seat weight adjustment and height adjustment.

Another primary object of the present invention is to provide an apparatus for independently adjusting height and weight adjustment of a seat suspension and to ensure that the seat does not travel above its intended maximum height or below its intended minimum height.

Another primary object of the present invention is to provide a valve for easily and completely lowering the seat, when activated, to its lowest position for easy entry and exit from the vehicle and to automatically reposition the seat to its original height position when the valve is de-activated.

Another primary object of the present invention is to provide a seat suspension assembly which automatically allows complete descent of the seat when the vehicle tips to a dangerous angle or rolls over.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 5 is a partial perspective view of a height/weight adjustment valve and associated linkage of the present invention as used with a scissors suspension system.

DETAILED DESCRIPTION OF THE PREFERRED EMBODIMENT

Figure 1:
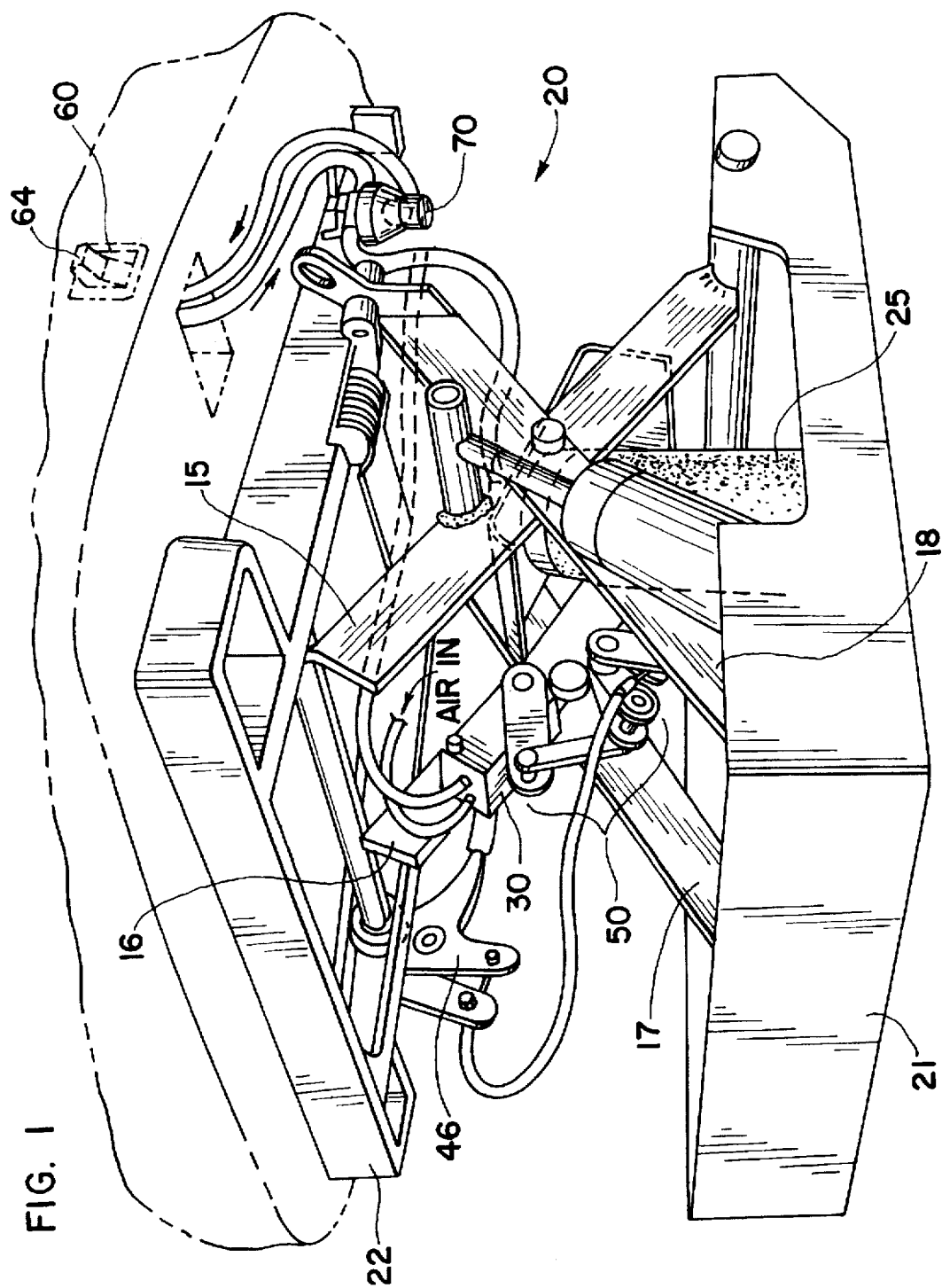
FIG. 1 is a perspective view of the seat suspension assembly of the present invention.

The preferred embodiment of the present invention, as shown in FIG. 1 and designated generally 20, employs a scissors linkage seat suspension assembly as is well known in the art. It is possible, of course, that the apparatus of the present invention may be used with parallelogram linkage suspensions, as well. The present invention also utilizes a pneumatic air spring 25 in operative communication with the scissors linkage via plate 26 to provide a seat suspension. Employed with the scissors linkage and air spring are a pneumatic plumbing system, as best shown in FIG. 2, and a mechanical actuator 30 and linkage assembly 50.

Air spring 25 is operatively coupled to the inner parallel scissors arms 15 and 16. As pressurized air is added to air spring 25, air spring 25 inflates and exerts an upward force on scissors linkage arms 15, 16 which causes the scissors linkage assembly to raise upper support 22. Conversely, releasing air from air spring 25 causes air spring 25 to deflate, causing upper support 22 to descend relative to lower support 21.

The present pneumatic plumbing assembly and mechanical linkage assembly work in conjunction with the scissors linkage to provide a seat suspension system which independently, automatically, and simultaneously allows weight adjustment, height adjustment, and safety deflation while also providing for manual de-activation for convenient access to the seat, as will now be described.

Figure 2:
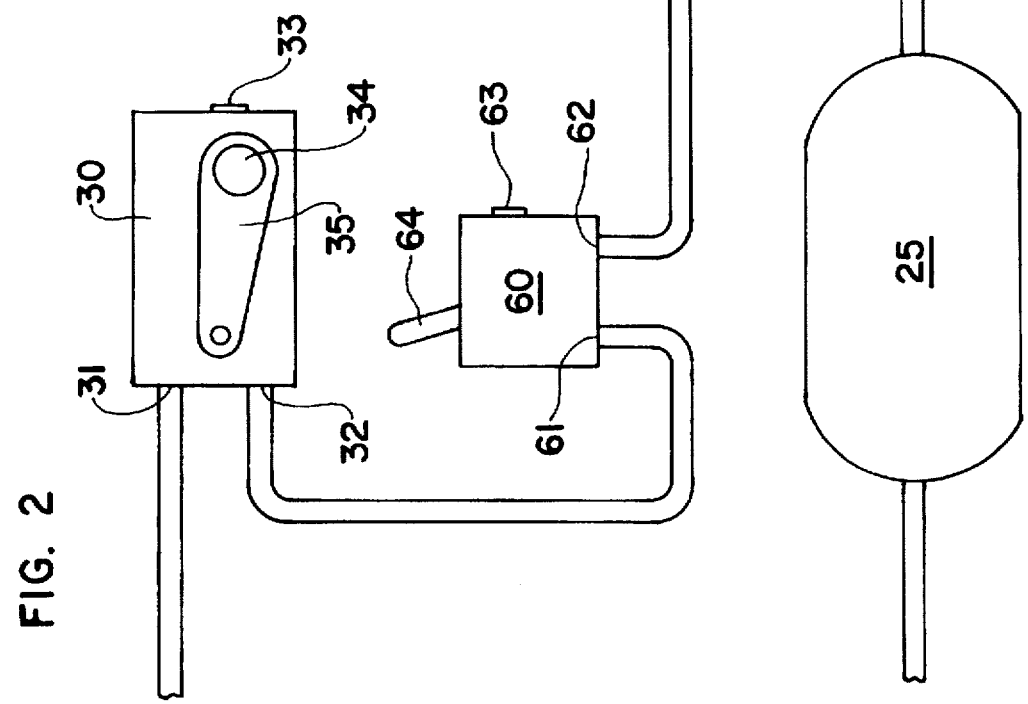
FIG. 2 is a flow diagram of the pneumatic plumbing of the present invention.

Referring to FIG. 2, pressurized air supplied by the vehicle is routed to and through suspension rotary leveling valve 30, to and through suspension dump valve 60, to and through safety valve 70, and into air spring 25.

Leveling valve 30 is preferably of a type manufactured by GT Development Corporation of Seattle, Wash. under Part No. 3106-1, but any similar device as is known to those of ordinary skill in the vent art may be employed. Leveling valve 30 is securely mounted to inner scissors linkage arm 15 or 16. Leveling valve 30 has inlet 31, outlet 32 and vent 33. Inlet 31 is in fluid communication with a vehicle-supplied source of pressurized air preferably within the range of 90–110 pounds per square inch which is generally standard on class 6, 7, and 8 trucks. Outlet 32 of leveling valve 30 is in fluid communication with dump valve 60 which is explained below.

Rotatably disposed within leveling valve 30 is shaft 33 which is coincident with the fluid path between inlet 31 and outlet 32. Shaft 34 is designed such that it intermittently allows leveling valve 30 to vent air, transmit air, or maintain pneumatic equilibrium based on the relative rotational angle 8 between the leveling valve body 30 and shaft 34. Valve 30 accomplishes this intermittent functioning via circumferentially spaced, axially directed fluid apertures (not shown) at predetermined locations along shaft 34 within valve 30. These fluid apertures define a fluid path between valve inlet 31 and valve outlet 32 or vent 34. As will be apparent to those of ordinary skill in the art, the relative spacing of these apertures along shaft 34 will define the different angular displacements θ at which the valve will vent air, transmit air or remain neutral. These apertures are positioned such that when angle θ is at some predetermined value α, valve 30 will maintain the pneumatic equilibrium of the system. As angle θ increases (when shaft 34 rotates clockwise relative to valve body 30 as illustrated in FIG. 5), valve 30 works to transmit air through outlet 32, thus raising seat upper housing 22. As angle θ decreases (when shaft 34 rotates counterclockwise relative to valve body 30), valve 30 works to vent air through vent 33, thus lowering seat upper housing 22.

As best visualized with reference to FIGS. 1 and 5, valve body 30 is securely attached to inner scissors arm 15 or 16, having shaft 34 rotatably disposed within and extending outwardly therefrom. Valve arm 35 is fixedly attached to shaft 34 and extends perpendicularly from axis of rotation 37 of shaft 34. Link 39 is rotatably connected to the distal end of valve arm 35. Link 39 extends generally downward from valve arm 35 and is rotatably coupled to actuator arm 40. Actuator arm 40 is rotatably mounted, via spindle 42, to bracket 41 which is securely attached to outer scissors arm 17 or 18. Coaxially, operatively mounted on spindle 42 are levers 43 and 45 extending radially therefrom. Cable 44 is operatively attached to the distal end of lever 43 and cable housing 47 is attached to lever 45 such that movement of cable 44 rotates rod 43 relative to rod 45, causing rotation of actuator arm 40. Cable 44 extends to seat height adjustment actuator 46 mounted in proximity to upper housing 22 for easy, convenient manipulation by the seat occupant. As will be appreciated by one of ordinary skill in the art, mechanical linkage assembly 50 may take any suitable form to cause mechanical rotation of actuator arm 40 relative to levers 43 and 45 and spindle 42 and bracket 41. For instance, levers 43 and 45 may be disposed on the opposite side of bracket 41 as shown, or the linkage assembly may be configured such that cable 44 is attached to lever 43 and cable housing 47 is attached to actuator arm 40 thus eliminating lever 45.

In operation, leveling valve 30 works to automatically adjust air spring 25 based on angular rotation of shaft 34 within valve 30. A seat occupant operates actuator 46 to adjust cable 44 to mechanically situate actuator arm 40 which, in turn, via link 39, mechanically rotates valve arm 35. As valve arm 35 rotates, shaft 34 within valve 30 rotates which causes valve 30 to either vent or transmit pressurized air, depending on the rotational angle θ. If the seat occupant raises actuator 46, angle θ will increase and cause valve 30 to transmit air to air spring 25 causing upper support 22 to travel upward until angle θ equals α. When angle θ equals α, valve 30 will maintain pneumatic equilibrium.

If the seat occupant lowers actuator 46, lever arm 35 will rotate counterclockwise as shown by arrow B in FIG. 5, thus causing valve 30 to vent air from air spring 25 causing upper housing 22 to descend until the angle θ again equals α, as seen in FIG. 1. By this means, a seat occupant manually adjusts the height of upper support 22 of the seat.

Valve 30 also, simultaneously, operates to independently adjust the suspension according to the weight of a seat occupant. Once the seat height is manually adjusted, a certain angular relationship, angle α, is established between valve 30 and valve arm 34 and between opposing scissors arms. When a seat occupant sits on upper housing 22, his or her weight will exert a force on the suspension system and, thus, on air spring 25. An average man or woman will cause air spring 25 to compact somewhat. As will be appreciated, when air spring 25 is compacted, the angle θ between scissors arms will decrease. Because actuator arm 40 is connected to one scissors arm 16 and valve arm 35 is connected to an opposing scissors arm 17, the angular change will be felt by valve 30. This rotational movement of shaft 34 within valve 30 causes air to be supplied to airspring 25. Thus, valve 30 will work to automatically adjust air spring 25 to account for the weight of the seat occupant until angle θ again reaches equilibrium value α. It thereby operates to independently and automatically adjust the height of upper housing 22 for the weight of a seat occupant.

Valve 30 also offers another unique feature in that it will prevent upper housing 22 from raising beyond its intended range and from descending beyond its intended range. Valve 30 thus prevents the seat from "topping out" or "bottoming out" and thereby losing its suspension characteristics. Valve 30 offers such ride zone protection in any configuration of seat suspension systems by varying the apertures 36 of shaft 34 such that valve 30 will only transmit air to air spring 30 until angle θ reaches a certain specified angle β. Angle β represents the angle at which any given suspension linkage apparatus has reached its maximum height adjustment. Conversely, valve 30 will cease venting air when angle θ reaches a certain minimum angle α representing the angle at which the suspension linkage apparatus has reached its minimum height adjustment. Valve 30 thus prevents the suspension from "bottoming out" and "topping out."

Valve 30 further decreases the effects of dead band in the suspension system. Dead band is the range of vertical movement of the upper and lower housings allowed by the suspension system without the suspension system compensating for the movement by adding or venting air from the air spring. It will be appreciated that there exists a range of angular rotation, or "play", of shaft 34 within which valve 30 will not work to transmit or vent air although upper housing 22 has moved relative to lower housing 21. This dead band occurs because of the circumferential displacement between apertures 36 along shaft 34. Dead band should be minimized because the more upper housing 22 moves relative to lower housing 21 without the suspension system compensating for the change, the more uncomfortable the seat occupant will be. The present invention minimizes dead band by relating the angular rotation of shaft 34 to the opposing scissors arms. Placing valve 30 on one scissors arm 16 and the point of reference establishing angle θ, linkage assembly 50, on the opposing scissors arm 17 allows valve 30 to be twice as responsive to dead band than would valve 30 be if linkage assembly 50 were fixed relative to lower housing 21.

The valve assembly thus works to independently adjust for height and weight while providing a seat occupant with convenient access to manual height adjustment, prevents bottoming and topping out the suspension, and minimizes dead band.

The present suspension also offers certain safety and convenience features. Referring to FIG. 2, after air is transmitted from leveling valve 30, it flows through dump valve 60. Dump valve 60 is normally open and allows uninhibited flow of air to air spring 25. Dump valve 60 has inlet 61, outlet 62, vent 63, and valve stem 64 and is mounted in proximity to a seat occupant as seen in FIG. 1. Dump valve 60 is of any type well known to those of ordinary skill in the art having the capabilities stated herein. When the suspension system is in operation, air passes into dump valve inlet 61 and out dump valve outlet 62 uninhibited. If a seat occupant, however, desires to lower the seat to its lowest height to enter or exit the vehicle, stem 64 of dump valve 60 can be actuated to close inlet 61 and open vent 63 which releases air from air spring 25. As such, air inlet 61 of dump valve 60 is capped while air spring 60 is deflated through vent 63 to cause upper housing to descend completely. When the seat occupant de-activates dump valve 60 via stem 64, vent 63 of dump valve 60 is closed, pneumatic communication is again established with the outlet 32 of leveling valve 30, and uninhibited fluid communication is again established between leveling valve 30 and air spring 25. As such, air spring 25 is again inflated to provide suspension to the seat. It will be appreciated that, all else being equal, when dump valve 60 is de-activated, upper housing 22 will return to the position it held just prior to dump valve 60 being activated.

Figure 3:
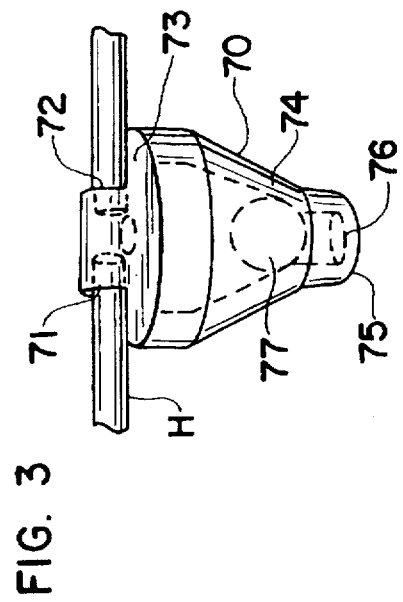
FIG. 3 is a side view of the rollover valve of the present invention in normal operating conditions.
Figure 4:
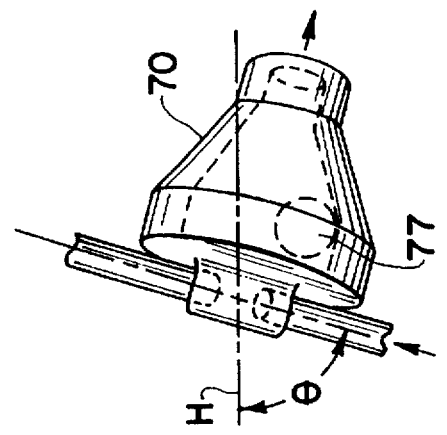
FIG. 4 is a side view of the rollover valve of the present invention, as shown in FIG. 3, in the rollover, actuated position.

As best seen in FIG. 3, immediately downstream from and in fluid communication with dump valve 60 is safety valve 70. Safety valve 70 is preferably of a type manufactured by GT Development Corporation of Seattle, Wash. Safety valve 70 is substantially conical having inlet 71, outlet 72, top 73, sidewall 74 and lower face 75. Safety valve 70 is mounted to the vehicle seat such that the top 73 of safety valve 70 is substantially horizontal, as shown by line H in FIG. 3. Sidewall 74 of safety valve 70 tapers downward from top 73 in a conical fashion to lower face 75 and defines an interior 76. Within lower face 75 is at least one aperture 76. Movably disposed within interior 76 of safety valve 70, is sphere 77. When safety valve 70 is in its normally substantially horizontal position, sphere 77 contacts conical sidewall 74 of safety valve 70, forming an air-tight seal, as shown in FIG. 3. Thus, when safety valve 70 is in its substantially horizontal position, pressurized air enters inlet 71 and exits outlet 72. If safety valve 70 (and, thus, the vehicle seat) tips to a predetermined angle λ, sphere 77, by force of gravity, dislodges from sidewall 74 of safety valve 70 thus destroying the air-tight seal. When the air-tight seal is broken, air from air spring 25 is released through aperture 76 disconnecting the pressurized air supply to air spring 25. Disconnecting the air supply to air spring 25 allows a seat occupant to lower and exit the seat in such a roll-over situation. It has been found that the preferred roll-over angle λ which the seat must achieve before safety valve 70 operates to deflate air spring 25 is approximately 80 degrees from horizontal. It will be appreciated that in different vehicle situations, the preferred roll-over angle λ will change. It will further be appreciated that changing various features of safety valve 70, such as the taper of sidewall 74, the size and weight of sphere 77, and other factors well known to those of ordinary skill in the art, will affect the design and functioning of the valve.

The present invention therefore provides a pneumatic seat suspension system which allows independent and automatic height and weight adjustment, a dump valve for convenient entry and exit, and a safety roll-over valve to disconnect the pressurized air supply to deflate the suspension in dangerous situations.

Of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. In a vehicle seat suspension system comprising a linkage assembly having first and second pairs of linkage arms, an upper support and a lower support, an air spring operatively communicating with the linkage assembly, and a suspension adjustment lever, the improvement comprising:

a pneumatic height adjuster valve adapted to allow the upper support to travel vertically within a predetermined range, said valve being in pneumatic communication with an air source and with the air spring and being coupled to one of the first pair of linkage arms, and a connection assembly operatively connected to one arm of the second pair of linkage arms configured to allow the pneumatic height adjuster valve to respond to movement of the upper support;

a dump valve in pneumatic communication with the air spring and having an actuator that permits the release of air from the air spring, to thereby allow the upper support to descend to its lowest position; and a rollover valve in pneumatic communication with the air spring to permit the automatic release of air from the air spring when the angle between the plane of the upper support and horizontal reaches a predetermined value.

2. The vehicle seat suspension system of claim 1 further comprising a shock absorber pivotally connected to the linkage assembly to dampen vertical travel of the upper support.

3. In a vehicle seat suspension system comprising a linkage assembly, an upper support and a lower support, a pneumatic air spring, and a suspension adjustment lever, the improvement comprising:

means for preventing the upper support from traveling outside a given range;

means for causing the upper support to travel to its lower most position relative to the lower support independently of the suspension adjustment lever; and means for automatically allowing the upper support to travel to its lowermost position relative to the lower support when the angle between the plane of the upper support and horizontal reaches a predetermined value.

4. The vehicle seat suspension system of claim 3 further comprising means for damping vertical travel of the upper support.

5. In a vehicle seat suspension system comprising a linkage assembly having first and second pairs of linkage arms, an upper support and a lower support, an air spring operatively communicating with the linkage assembly, and a height adjustment lever, the improvement comprising:

a pneumatic control valve adapted to allow the upper support to travel vertically within a predetermined range, said valve being in pneumatic communication with an air source and with the air spring and being coupled to one arm of the first pair of linkage arms;

a connection assembly secured to said other arm of the first pair of linkage arms and communicating with the pneumatic control valve responsive to an angular change between said first and second arms;

wherein the height adjustment lever is manually operable to cause the valve to adjust the height of the upper support to attain an equilibrium height, and the connection assembly causes the valve to automatically respond to said angular change to maintain the equilibrium height of the seat.

6. The suspension assembly of claim 5 wherein the valve includes a rotating shaft for regulating air flow to the air spring based on an angle θ between the valve and the shaft and the connection assembly comprises:

a bracket secured to said other arm of the first pair of linkage arms and having a spindle having at least one height adjust arm and a weight adjust arm communicating with said valve shaft attached thereto and said height adjust lever communicating with said at least one height adjust arm whereby the lever is manually operable to rotate the spindle to define an angle θ setting an equilibrium height of the upper support.

7. An air suspension system for a seat having independent height adjustment and weight adjustment comprising:

a base;

an upper support mechanically connected to the base and adapted to travel vertically with respect to the base;

an air spring adapted between the base and upper support to cause the upper support to travel vertically relative to the base;

a height adjust valve in pneumatic communication with the air spring and operably responsive to movement of the upper support relative to the base;

a dump valve in pneumatic communication with the air spring and having an actuator permitting the release of air from the air spring to allow the upper support to descend to a lowermost position relative to the base;

a safety valve in pneumatic communication with the air spring to permit the automatic release of air from the air spring when the angle between the plane of the upper support and horizontal reaches a predetermined valve; and a source of pressurized air operably communicating with the air spring, the height adjust valve, the dump valve and the safety valve via a single conduit;

whereby the height adjust valve can be manually adjusted to establish a neutral height of the upper support relative to the base and automatically maintains the established neutral height.

8. The suspension system of claim 7 wherein the height adjust valve includes a rotating shaft for regulating air flow to the air spring based on an angle θ between the valve and the shaft and the upper support is mechanically connected to the base via a linkage assembly including at least one pair of linkage arms, and further comprising a connection assembly which comprises:

a bracket secured to one arm of the at least one pair of linkage arms and having a spindle having at least one height adjust arm and a weight adjust arm communicating with said valve shaft attached thereto and a height adjust lever communicating with said at least one height adjust arm whereby the lever is manually operable to rotate the spindle to define an angle θ setting a neutral height of the upper support.

* * * * *